United States Patent
Niioka et al.

(10) Patent No.: US 7,729,611 B2
(45) Date of Patent: Jun. 1, 2010

(54) METHOD OF DETECTING POSITION OF PRINTING MEDIUM PERFORMED IN PRINTING APPARATUS

(75) Inventors: Koji Niioka, Tatsuna-machi (JP); Eiichi Miyashita, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 674 days.

(21) Appl. No.: 11/727,784

(22) Filed: Mar. 28, 2007

(65) Prior Publication Data

US 2007/0188831 A1 Aug. 16, 2007

Related U.S. Application Data

(63) Continuation-in-part of application No. 11/391,210, filed on Mar. 29, 2006.

(30) Foreign Application Priority Data

Mar. 29, 2005 (JP) .................. P. 2005-094784
Mar. 28, 2006 (JP) .................. P. 2006-088285

(51) Int. Cl.
*G03D 13/00* (2006.01)
*B41J 29/393* (2006.01)

(52) U.S. Cl. ....................... 396/661; 347/19
(58) Field of Classification Search ........... 396/661; 347/19

See application file for complete search history.

(56) References Cited

U.S. PATENT DOCUMENTS 7,175,355 B2 * 2/2007 Narusawa .................. 400/76

FOREIGN PATENT DOCUMENTS

| JP | 2002-326398 A | 11/2002 |
| JP | 2002-329164 A | 11/2002 |
| JP | 2003-223088 A | 8/2003 |
| JP | 2003-285472 A | 10/2003 |
| JP | 2004-114357 A | 4/2004 |

* cited by examiner

*Primary Examiner*—Rodney E Fuller
(74) *Attorney, Agent, or Firm*—Sughrue Mion, PLLC (57) ABSTRACT

In order to detect a position of an optical recording medium on which printing is performed, it is provided an optical sensor provided with include a photo emitter operable to emit light and a photo receiver operable to receive light and output a first signal in accordance with an amount of the received light. The optical sensor is transported to a position above a marker provided on the tray. Light is emitted from the photo emitter to irradiate the marker. Light reflected from the marker is received by the photo receiver. A reference value is determined based on a first value of the first signal outputted when the marker is irradiated. A predetermined calculation is executed with respect to the reference value to determine a threshold value. The optical sensor is transported above the tray, while emitting light from the photo emitter and comparing the first signal outputted from the photo receiver with the threshold value. A position of the marker is identified based on the comparison of the first signal and the threshold value. It is determined a position at which the printing begins based on the identified position of the marker.

4 Claims, 10 Drawing Sheets

METHOD OF DETECTING POSITION OF PRINTING MEDIUM PERFORMED IN PRINTING APPARATUS

CROSS-REFERENCE OF RELATED APPLICATION

This is a continuation-in-part application of U.S. patent application Ser. No. 11/391,210 filed on Mar. 29, 2006.

BACKGROUND

The present Invention relates to a method of detecting a position of a printing medium which is performed in a printing apparatus.

In recent years, printers are commercially distributed to enable printing information such as texts, images, etc. on a labeled surface of an optical recording medium, for example, CD-R (Compact Disk Recordable), etc. In the case where such printer is used to print on an optical recording medium in the form of a disk, a disk tray is in some cases used to hold the optical recording medium to feed the same into the printer.

Such disk tray comprises a part for supporting an optical recording medium, and the disk tray moves in a secondary scanning direction (a direction of conveyance of a printing medium such as paper) of the printer to enable a recording head to print on a labeled surface of an optical recording medium.

By the way, in case of printing on such optical recording medium, correct printing cannot be performed unless the printer recognizes a size and a position of the optical recording medium. Hereupon, Japanese Patent Publication No. 2004-114357A (JP-A-2004-114357) discloses a method of using a printer to print scales on an adjustment medium having the same shape of CD-R, on which a reference line is beforehand printed, identifying shift of a printed position according to how the reference line and the scales overlap, and adjusting a printed position according to the identified shift.

Alternatively, there is proposed a method of applying a marker in a predetermined position on a disk tray, reading the marker with an optical sensor, indirectly finding a position of an optical recording medium from the positional relationship between the marker and a support part for the optical recording medium, and adjusting a printed position according to the position as found.

By the way, with the former technique disclosed in. Japanese Patent Publication No. 2004-114357A, it is necessary to print scales on an adjustment medium in order to perform the positional adjustment, and it is also necessary for a user to visually confirm results of printing, thus causing a problem that an operation is complicated.

Also, with the latter technique, a marker provided on a disk tray is sometimes varied in light optical reflectance due to secular change, in which case there is caused a problem that it is not possible to correctly detect a position of a marker.

SUMMARY

It is therefore one advantageous aspect of the invention to provide a method of easily and stably detect a position of a printing medium in spite of secular change, which is performed in a printing apparatus.

In order to achieve the above object, according to the invention, there is provided a method of detecting a position of an optical recording medium on which printing is performed, comprising, providing an optical sensor comprising a photo emitter operable to emit light and a photo receiver operable to receive light and output a first signal in accordance with an amount of the received light;

transporting the optical sensor to a position above a marker provided on the tray;

emitting light from the photo emitter to irradiate the marker;

receiving light reflected from the marker with the photo receiver, determining a reference value based on a first value of the first signal outputted when the marker is irradiated;

executing a predetermined calculation with respect to the reference value to determine a threshold value;

transporting the optical sensor above the tray, while emitting light from the photo emitter and comparing the first signal outputted from the photo receiver with the threshold value, identifying a position of the marker based on the comparison of the first signal and the threshold value; and determining a position at which the printing begins based on the identified position of the marker.

The calculation may be magnification with a value greater than 1.

The calculation may be based on the first value of the first signal and a second value of the first signal outputted when another part of the tray is irradiated by the light emitted from the photo emitter.

The calculation may include: obtaining a third value which is a difference between the first value and the second value; obtaining a fourth value by multiplying a predetermined value and the third value; and obtaining the threshold value by adding the first value and the fourth value.

The method may further comprise:

transporting the optical sensor to positions at which the marker is assumed to be placed;

emitting light from the photo emitter at the respective positions to irradiate the tray;

receiving light reflected from the tray at the respective positions to generate detection signals; and judging at least one of whether a position of the tray is normal and whether a state of the marker is normal, based on the detection signals.

The judging may be performed whether a difference between a maximum value and a minimum value of the detection signals is no less than a prescribed value. It may be judged an abnormal state of at least one of the position of the tray and the state of the marker when the difference is no less than the prescribed value.

The judging may be performed whether the maximum value is no less than a prescribed value. It is judge an abnormal state of at least one of the position of the tray and the state of the marker when the maximum value is no less than the prescribed value.

According to one aspect of the invention, there is provided a program product comprising a program operable to cause a computer to execute the above method.

According to one aspect of the invention, there is provided a printing apparatus, adapted to perform printing on an optical recording medium placed on a tray provided with a marker, comprising:

a tray, comprising a body adapted to mount the optical recording medium, and a marker provided on the body;

an optical sensor, comprising a photo emitter operable to emit light and a photo receiver operable to receive light and output a first signal in accordance with an amount of the received light;

a transporter, operable to transport the optical sensor above the tray;

a reference value provider, operable to determine a reference value based on a first value of the first signal outputted when the marker is irradiated with the light emitted from the photo emitter;

a calculator, operable to execute a predetermined calculation with respect to the reference value to determine a threshold value;

a comparator, operable to compare the first signal and the threshold value when the optical sensor is transported above the tray while emitting the light from the photo emitter; and a position identifier, operable to identify a position of the marker based on the comparison of the first signal and the threshold value, and to determine a position at which the printing begins based on the identified position of the marker.

The body of the tray may have a first optical reflectance and the marker may have a second optical reflectance which is higher than the first optical reflectance.

The body of the tray may be formed with a through hole located adjacent to the marker.

BRIEF DESCRIPTION OF THE DRAWINGS

The above objects and advantages of the present invention will become more apparent by describing in detail preferred exemplary embodiments thereof with reference to the accompanying drawings.

DETAILED DESCRIPTION OF EXEMPLARY EMBODIMENTS

Embodiments of the invention will be described below in detail with reference to the accompanying drawings.

Figure 1:
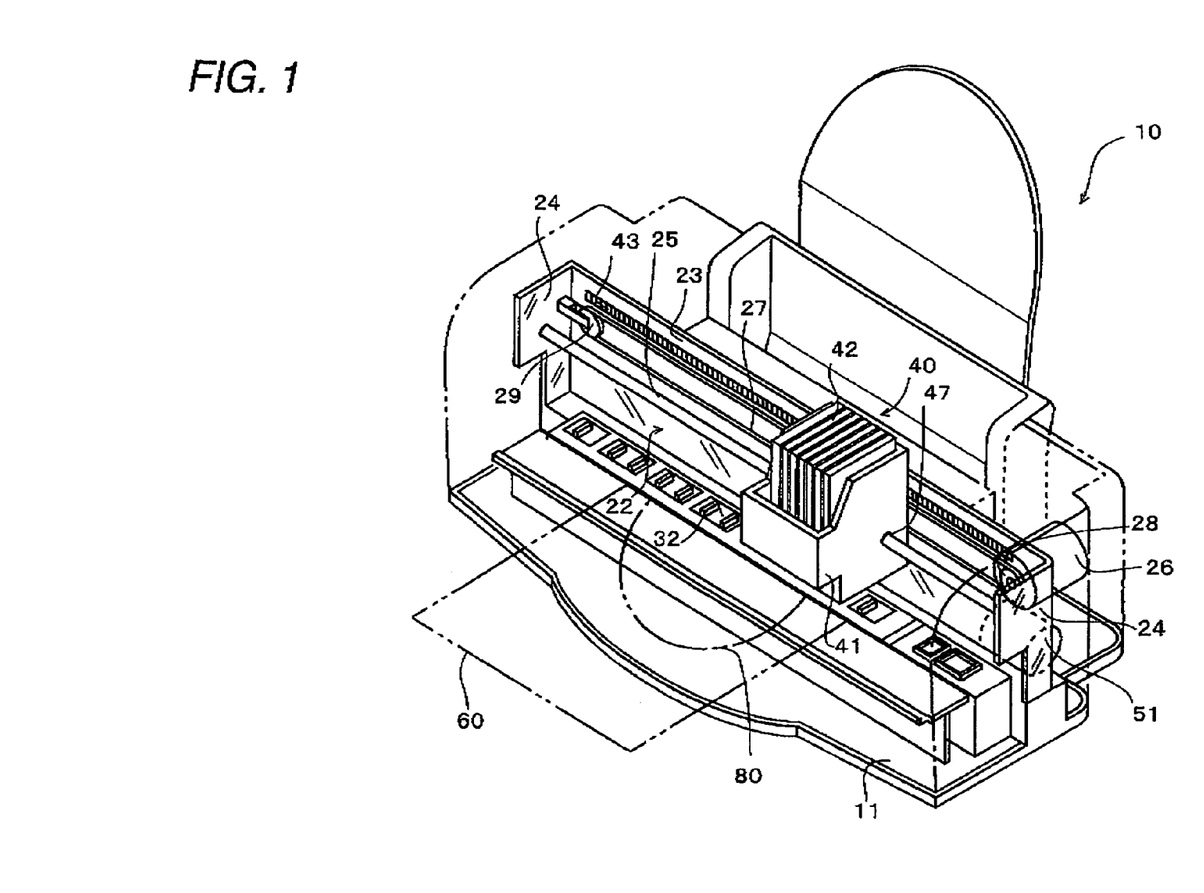
FIG. 1 is a perspective view of an inside of a printer according to one embodiment of the invention.
Figure 5:
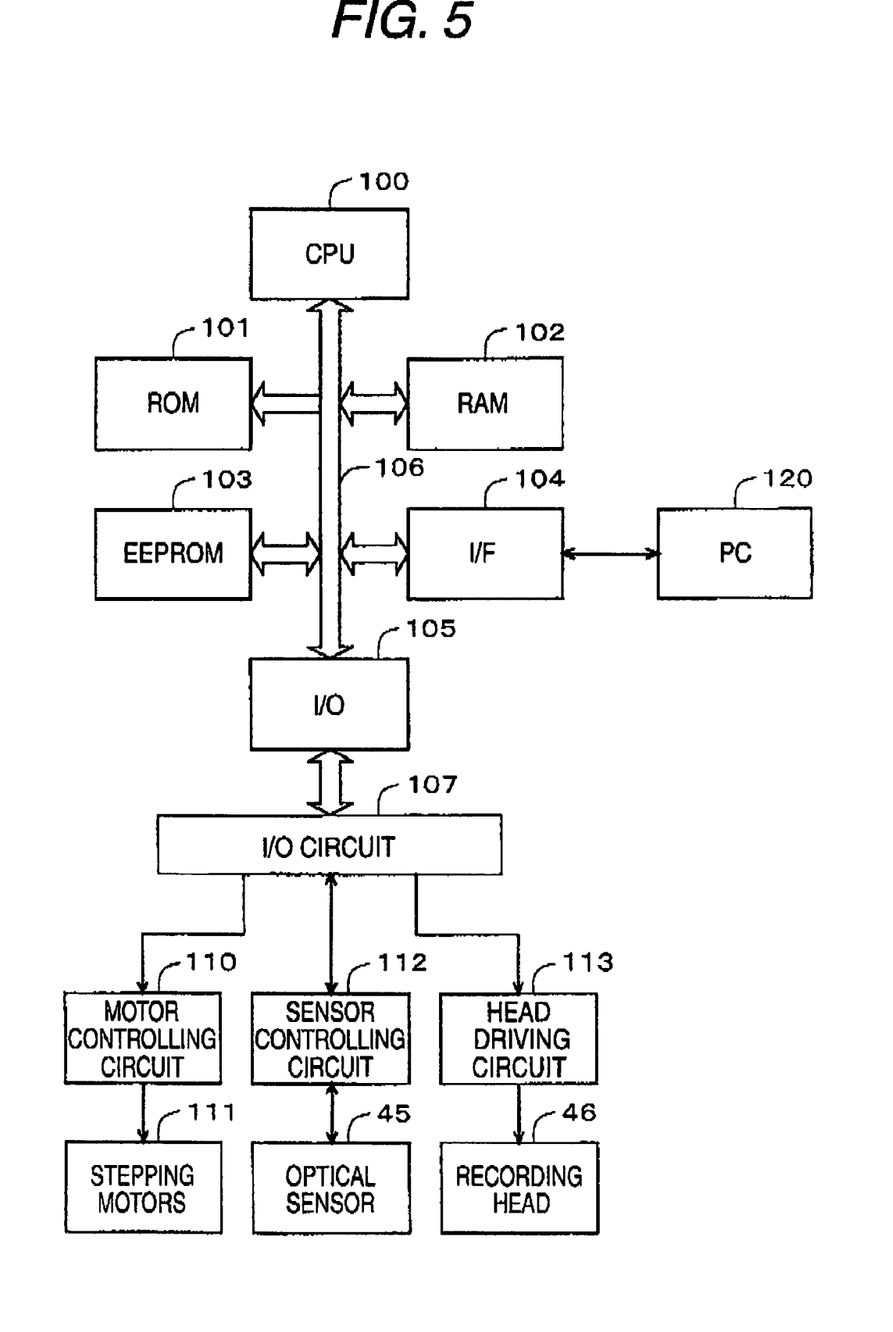
FIG. 5 is a block diagram showing a control system of the printer.

A printing apparatus referred to in this specification comprehends a printer 10 shown in FIG. 1, or a combination of the printer 10 and a personal computer 120 shown in FIG. 5. The printer 10 comprises a chassis 11, and a carriage 40 which is reciprocately movable relative to the chassis 11 in a primary scanning direction.

The carriage 40 comprises an ink cartridge 42 that stores black ink and color ink (yellow, cyan, magenta, etc.), and a mounting part 41 that mounts the ink cartridge. A recording head (not shown) is provided below the mounting part 41 to be opposed to a disk tray 60 or a printing sheet (not shown). A lower end face of the recording head defines a nozzle formation face, from which ink can be ejected.

A part of a timing belt 27 is fixed to the mounting part 41. Also, the mounting part 41 is formed with an insertion hole 47, through which an elongated guide shaft 25 can be inserted. The timing belt 27 is stretched between a drive pulley 28 of a carriage motor 26, and a follower pulley 29. Accordingly, when the carriage motor 26 rotates, the timing belt 27 is driven and the carriage 40 is moved along the guide shaft 25. At this time, since an encoder 43 outputs a signal corresponding to a position of the carriage 40, it is possible to know the position of the carriage 40 with reference to the signal.

A platen 32 having a plurality of ribs is provided in a position opposed to the nozzle formation face of the carriage 40 on the chassis 11, and the disk tray 60 holding thereon an optical recording medium 80 is conveyed above the ribs. Provided on an upstream side (a side, to which a printing sheet is fed) of the chassis 11 is a support frame 22 having a shielding plate portion 23 and side plate portions 24 on both ends of the shielding plate portion 23 to be bent toward a downstream side (a side, from which a printing sheet is ejected). Fixed to the side plate portions 24 are the driven pulley 29, around which the timing belt 27 is stretched, and the guide shaft 25. The carriage motor 26 is fixed to the shielding plate portion 23.

A sheet feeding motor 51 is provided on an upstream side of the shielding plate portion 23, a roller 20 is provided and rotated whereby the disk tray 60 is moved in the secondary scanning direction.

Figure 2A:
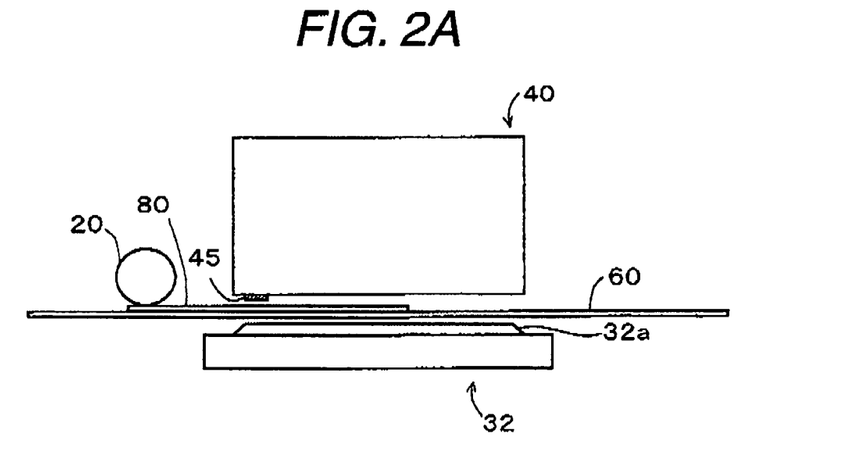
FIG. 2A is a schematic side view showing a positional relationship among a carriage, a disk tray and a platen in the printer.

As shown in FIG. 2A, the carriage 40 is provided in a position opposed to the platen 32 with the disk tray 60 therebetween. A plurality of ribs 32a are provided on a top of the platen 32, and the disk tray 60 is conveyed above the ribs 32a by the roller 20. An optical sensor 45 is provided on a bottom face of the carriage 40 to detect a position of a marker as described later, thereby calculating a position of the optical recording medium 80 and identifying a printing start position. Media, for example, CD-R or DVD-R (Digital Versatile Disk Recordable), etc., are used as the optical recording medium 80. In addition, while the optical recording medium 80 in an example shown in FIG. 2A is put in a state of projecting from the disk tray 60 for the simplification of the figure, the optical recording medium 80 is actually positioned in substantially the same level as a top of the disk tray 60 since a recess, into which the optical recording medium 80 is fitted, is provided on the top of the disk tray 60 (described later in detail).

Figure 2B:
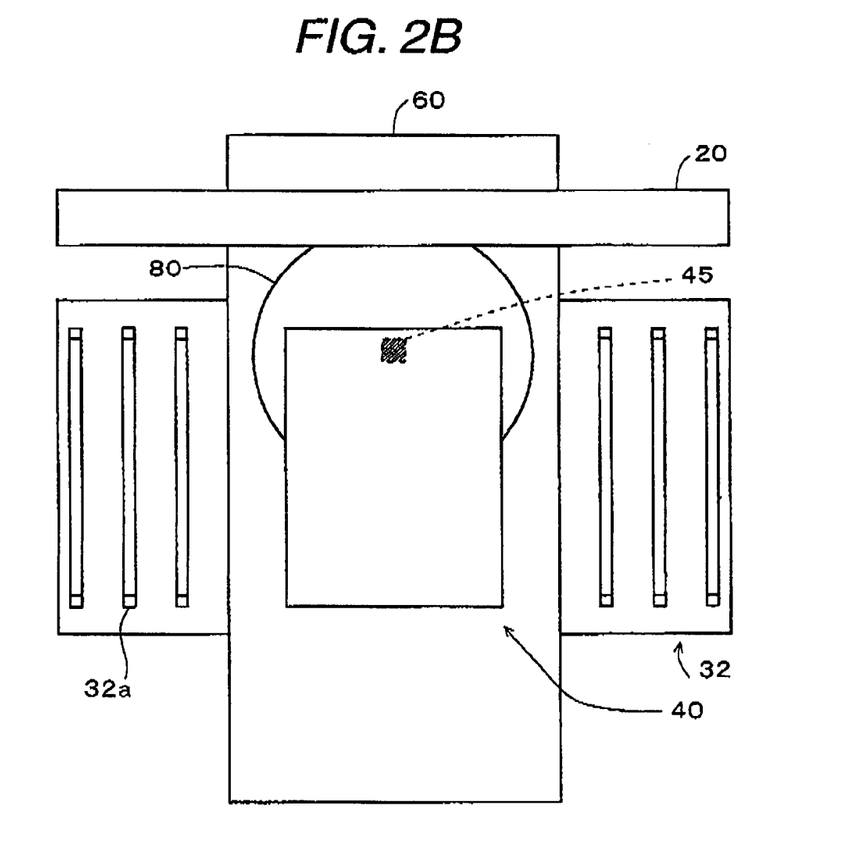
FIG. 2B is a schematic plan view showing the positional relationship.

As shown In FIG. 2B, the plurality of ribs 32a are provided on the top of the platen 32. Also, the optical sensor 45 is provided on the bottom face of the carriage 40 on an upstream side to detect a position of a marker.

Figure 3:
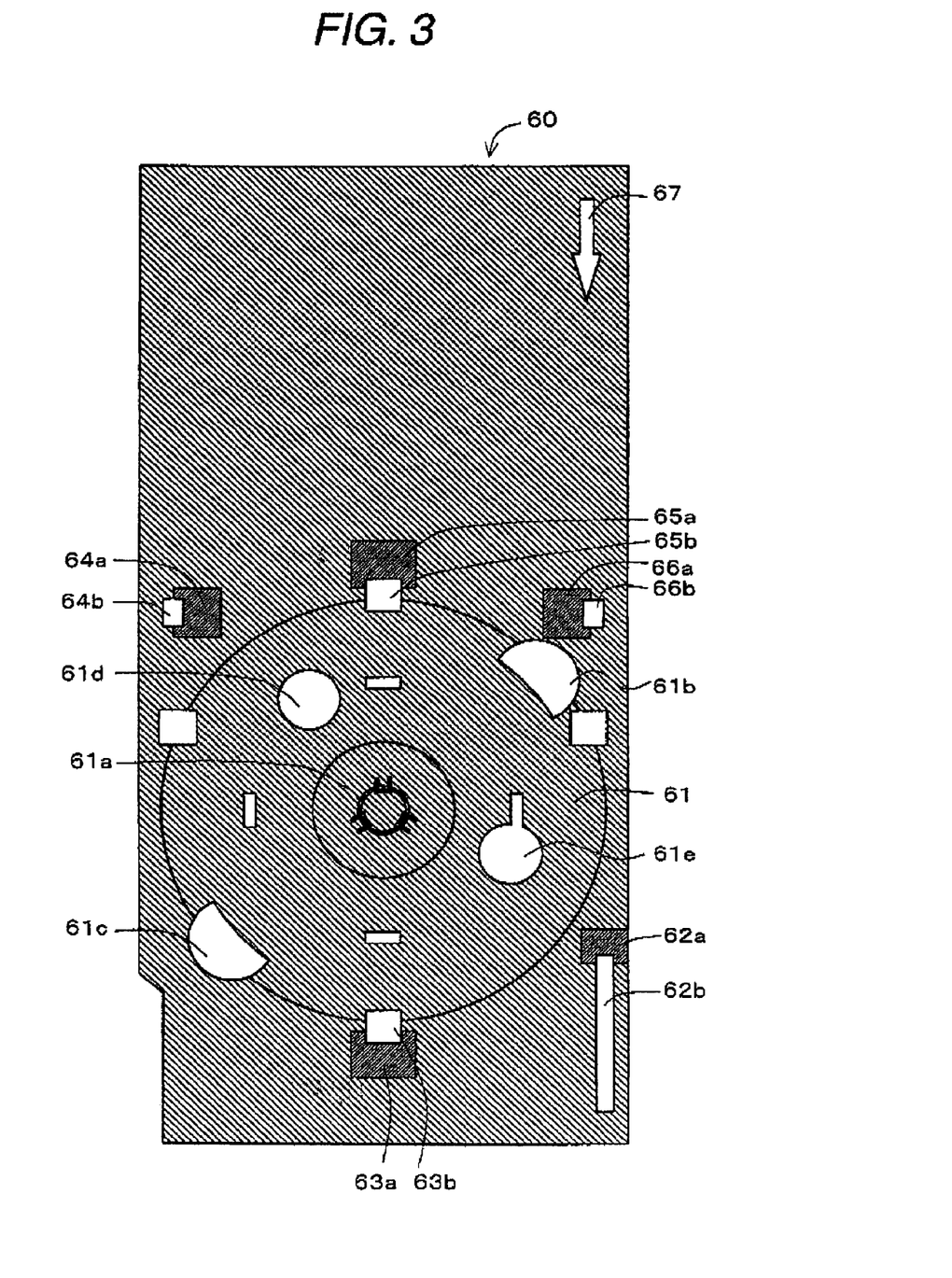
FIG. 3 is a plan view of a disk tray.

As shown in FIGS. 2A and 2B the disk tray 60 is a flat plate-shaped member having a predetermined thickness. As shown in FIG. 3, the disk tray 60 is formed with a recess 61, in which the optical recording medium 80 is placed. Provided centrally of the recess 61 is a disk support 61a, which is inserted into a drive hole formed centrally of the optical recording medium 80 to support the optical recording medium 80. Formed around the disk support 61*a* are holes 61*b*, 61*c*, 61*d* and 61*e*, into which fingers are inserted when an optical recording medium 80 is to be removed.

Formed on a right and lower part of the disk tray 60 are a marker 62*a* and a hole 62*b*, which detect the fact that the disk tray 60 has been inserted to a predetermined position of the printer 10. Also, formed at upper and lower ends of the recess 61 are markers 63*a*, 65*a* and holes 63*b*, 65*b*, by which a position of the optical recording medium 80 in the secondary scanning direction is detected. Further, formed on the left and right of an upper part of the recess 61 are markers 64*a*, 66*a* and holes 64*b*, 66*b*, by which a position of the optical recording medium 80 in the primary scanning direction is detected. In addition, the markers 62*a* to 66*a* are formed from a material (for example, a white plastic), which is higher in optical reflectance than a material (for example, a black plastic), which forms the disk tray 60. Also, the holes 62*b* to 66*b* are bored adjacent to the markers 62*a* to 66*a*. In addition, the disk tray 60 is inserted into the printer 10 in a direction indicated by an arrow 67.

Figure 4A:
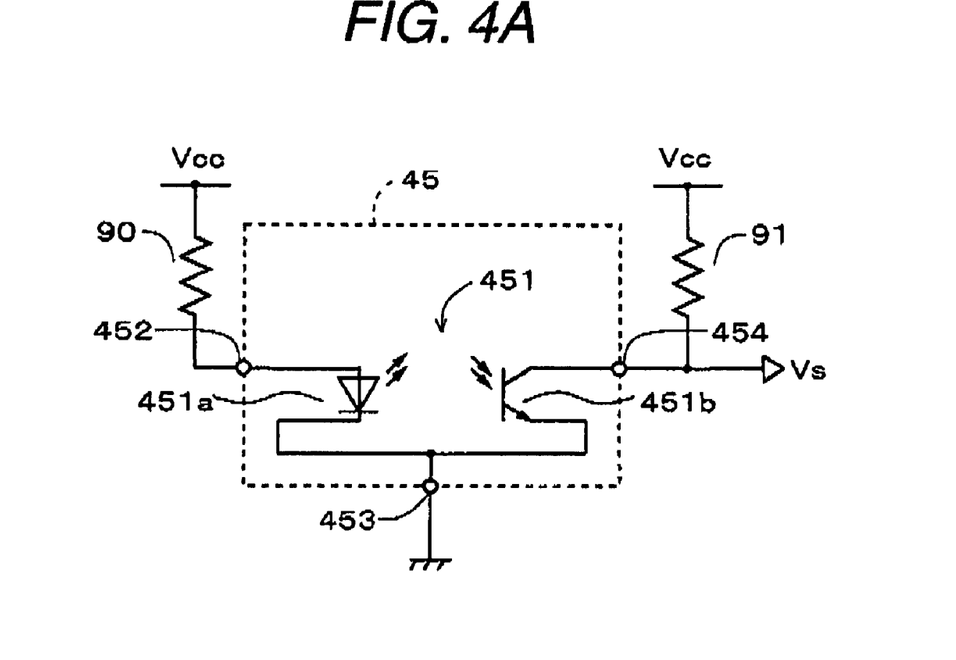
FIG. 4A is a circuit diagram of an optical sensor in the printer.

As shown in FIG. 4A, the optical sensor 45 comprises an optical sensor element 451. The optical sensor element 451 comprises a photo emitter 451*a* and a photo receiver 451*b* to irradiate light on the markers 62*a* to 66*a*to convert intensity of a reflected light into corresponding electric signals to output the same. Here, the photo emitter 451*a* is formed from, for example, a light emitting diode or the like to emit infrared rays. The photo receiver 451*b* is formed from, for example, a phototransistor or the like to permit a reflected light, which is emitted from the photo emitter 451*a* and reflected by the markers 62*a* to 66*a*, to be made incident thereupon, and thus is changed in resistance corresponding to the intensity of reflected light. In addition, the photo receiver 451*b* comprises, at a light incident part, a filter that attenuates visible light in order to lessen influences of ambient light (mainly, visible light).

The optical sensor element 451 is placed on, for example, a printed board, and connects thereto terminals 452, 453, 454 provided on the printed board, and an electric source and grounding of the printer 10. That is, the terminal 452 is connected to an anode of the photo emitter 451*a*, the terminal 452 being connected to one end of a resistor 90 arranged in a sensor controlling circuit 112 (described later) of the printer 10. Also, the terminal 453 is connected to a cathode side of the photo emitter 451*a*, an emitter side of the photo receiver 451*b*, and grounding of the sensor controlling circuit 112. Also, the terminal 454 is connected to a collector side of the photo receiver 451*b* and a resistor 91 arranged in the sensor controlling circuit 112.

Figure 4B:
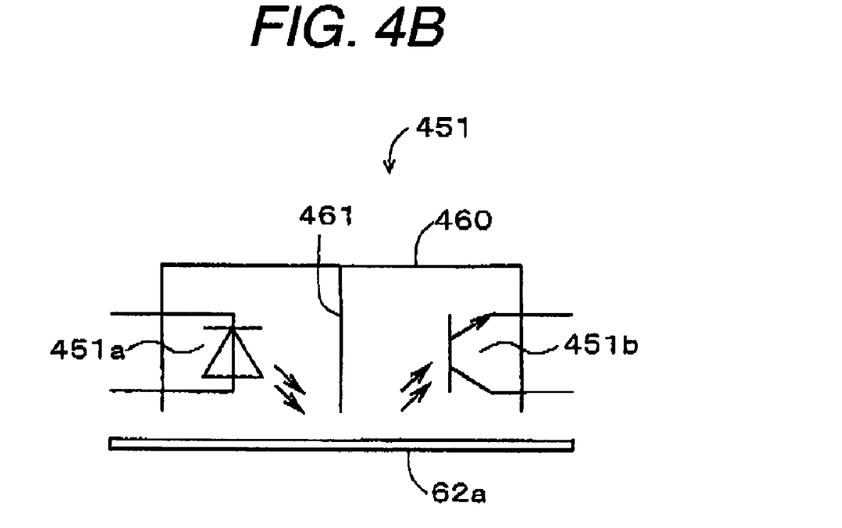
FIG. 4B is a schematic view showing the optical sensor and a marker provided on the disk tray.

As shown in FIG. 4B, the optical sensor element 451 comprises the photo emitter 451*a* and the photo receiver 451*b*, both of which are placed inside a housing 460 with a partition 461. Here, the housing 460 prevents an ambient light from being incident upon the photo receiver 451*b*. The partition 461 prevents light, which is emitted from the photo emitter 451*a*, from being made incident directly upon the photo receiver 451*b*. As shown in FIG. 4B, when the markers 62*a* to 66*a* being detected objects are present, light emitted from the photo emitter 451*a* is reflected by surfaces of the markers 62*a* to 66*a* to be made incident upon the photo receiver 451*b*. As a result, the photo receiver 451*b* is activated and an electric current flows through the resistor 91 from an electric source Vcc, so that Vs being an output voltage is put in a low state. On the other hand, when the markers 62*a* to 66*a* are not present, a reflected light is not made incident upon the photo receiver 451*b* and the photo receiver 451*b* is deactivated so that an output voltage Vs is put in a high state.

Subsequently, an explanation will be given to a control system of the printer 10 shown in FIG. 1. As shown in FIG. 5, the control system of the printer 10 comprises a CPU (Central Processing Unit) 100, a ROM (Read Only Memory) 101, a RAM (Random Access Memory) 102, a EEPROM (Electrically Erasable and Programmable ROM) 103, an I/F (Interface) 104, an I/O (Input and Output) unit 105, a bus 106, an I/O circuit 107, a motor controlling circuit 110, stepping motors 111, the sensor controlling circuit 112, the optical sensor 45, a head driving circuit 113, and a recording head 46, and the personal computer (PC) 120 is connected to the I/F 104.

Here, the CPU 100 executes various arithmetic processings according to programs stored in the ROM 101 and the EEPROM 103 and controls respective parts of the apparatus including the stepping motors 111.

The ROM 101 comprises a semiconductor memory that stores various programs executed by the CPU 100 and various data.

The RAM 102 comprises a semiconductor memory that temporarily stores programs executed by the CPU 100 and data.

The EEPROM 103 comprises a semiconductor memory, in which predetermined data obtained as a result of the arithmetic processings in the CPU 100 are stored and the data are held also after the electric source of the printer 10 Is interrupted.

The I/F 104 comprises a device for appropriate conversion of the form of data presentation when it gives and receives information from the personal computer 120. The I/O 105 comprises a device that gives and receives information from the input/output circuit 107:

The bus 106 comprises a signal conductor group that connects the CPU 100, the ROM 101, the RAM 102, the EEPROM 103, the I/F 104, and the I/O 105 mutually and enables giving and receiving information among these elements.

The motor controlling circuit 110 comprises, for example, a logic circuit and a drive circuit and controls the stepping motors 111 according to control by the CPU 100.

The stepping motors 111 comprises, for example, the carriage motor 26 and the sheet feeding motor 51 and drives the carriage 40 and the roller 20 according to control by the motor controlling circuit 110.

The sensor controlling circuit 112 is one that controls the optical sensor 45 and comprises the resistors 90, 91 shown in FIG. 4A and a buffer, which supplies the output voltage Vs from the optical sensor 45 to the input/output circuit 107.

The optical sensor 45 detects the markers 62*a* to 66*a* being detected objects as described above with reference to FIGS. 4A and 4B.

The head driving circuit 113 comprises a driver connected to the recording head 46, which executes a recording processing on a labeled surface of an optical recording medium 80, and exercises control of a recording processing on the recording head 46. As described above, the recording head 46 ejects ink of various colors from the plurality of nozzles according to control by the head driving circuit 113 and prints desired images and texts on a labeled surface of an optical recording medium 80.

Subsequently, an explanation will be given to an operation of the printer 10 with reference to FIG. 6.

Programs for execution of the flowchart are stored in the ROM 101, etc., read and executed by the CPU 100 at need. When the processings in the flowchart are started, the following steps are executed.

Step S10: A user places an optical recording medium 80 into the recess 61 of the disk tray 60 to fix the same with the disk support 61a, and thereafter inserts the disk tray 60 between the platen 32 and the carriage 40 of the printer 10 in the direction indicated by the arrow 67 in FIG. 3.

Step S11: The CPU 100 uses the optical sensor 45 to detect the marker 62a for confirmation of the fact that the disk tray 60 has been inserted to the predetermined position. In addition, the CPU 100 refers to control data (data indicative of a position of the marker 62a on the disk tray 60) stored in the ROM 101 to drive the carnage motor 26 to move the same to a position, in which the optical sensor 45 can detect the marker 62a.

Step S12: Referring to whether the marker 62a has been enabled to be detected in Step S12, the CPU 100 judges whether the disk tray 60 has been inserted to the predetermined position, proceeds to Step S13 in the case where the disk tray has been inserted, and repeats the same processing in a case except that. In addition, the case where the marker 62a cannot be detected in the processing conceivably includes, for example, the case where the disk tray 60 is inadequately inserted, or the case where the marker 62a is decreased in reflectance due to secular change, or the like. In the former case, the state of insertion can be confirmed by providing a switch, which is actuated when the disk tray 60 has been inserted to the predetermined position. Also, since the situation in the latter case can be avoided by a processing described later, the procedure may proceed to the processing in Step S13 in the case where the marker 62a cannot be detected even when the processings in Step S13 and Step S12 are repeated predetermined times.

Step S13: Referring to the control data stored in the ROM 1017 the CPU 100 controls the carriage motor 26 and the sheet feeding motor 51 to move the optical sensor 45 above a predetermined marker. In addition, selected as a marker being an object is the marker 63a closest to the marker 62a being made an object of detection in Step S11 and smallest in moving distance in the primary scanning direction and in the secondary scanning direction, or the markers 64a, 66a existent in an end, which is contacted by a user's fingers to be liable to become dirty. Alternatively, the marker 62a can be selected. An explanation is given below to an example, in which the marker 63a is made an object. In addition, the reason why a marker liable to become dirty is selected is that all the markers can be surely detected by selecting a marker being worst in property.

Step S14: The CPU 100 measures an output voltage Vb of the optical sensor 45 according to a reflected light from the marker 63a. That is, the CPU 100 controls the sensor controlling circuit 112 to have the photo emitter 451a of the optical sensor 45 irradiating a light As a result, the light irradiated from the photo emitter 451a is reflected by the marker 63a to be made incident upon the photo receiver 451b. Since the photo receiver 451b is varied in resistance according to the intensity of a reflected light, an output voltage Vs according to the Intensity of a reflected light appears in the resistor 91. The CPU 100 inputs therein to the output voltage Vs through the sensor controlling circuit 112 to make the same a voltage Vb corresponding to a reflected light from the marker 63a.

Step S15: The CPU 100 calculates a discriminant threshold Vth in detecting a marker That is, the CPU 100 doubles the voltage Vb corresponding to the marker 63a and found in Step S14 to provide Vth. Here, the magnification may be an arbitrary value greater than 1. Such value is determined individually and specifically according to the sensitivity of the optical sensor 45, the optical reflectance of the marker 63a, or the like.

Step S16: The CPU 100 controls the carriage motor 26 and the sheet feeding motor 51 to use the optical sensor 45 to detect positions of the markers 62a to 66a in a predetermined order. Specifically, in case of, for example, detecting the marker 64a and the marker 66a in the primary scanning direction, the CPU 100 controls the sheet feeding motor 51 to move the marker 64a and the marker 66a of the disk tray 60 to a position just below the optical sensor 45. The CPU 100 drives the carriage motor 26 to move the carriage 40 to a left end to move the carriage 40 to a right end while having the photo emitter 451a emitting light. At this time, the CPU 100 compares a voltage output from the optical sensor 45 with the discriminant threshold Vth, thereby identifying positions of the marker 62a and the marker 66a.

Figure 7A:
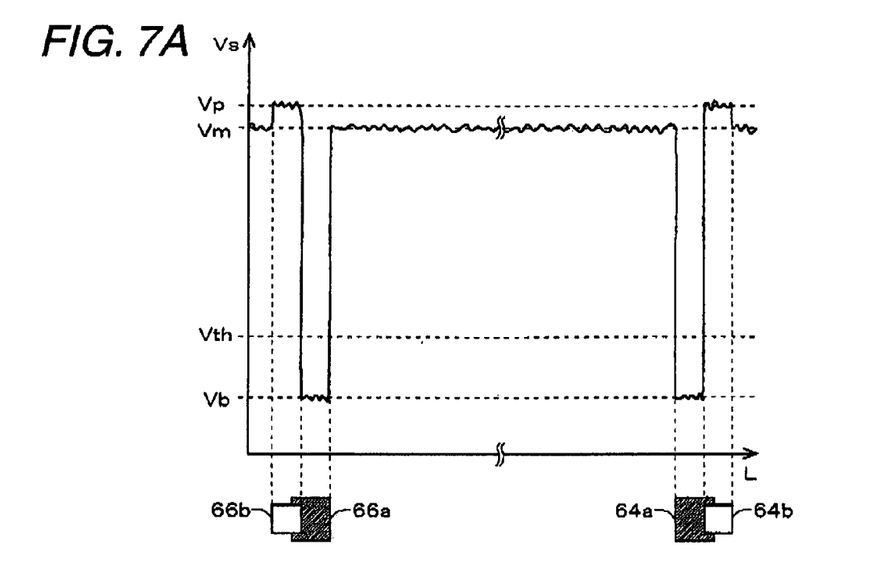
FIG. 7A is a diagram showing how to detect the marker in the processing when the condition of the maker is normal.

FIG. 7A shows a change in the output voltage Vs of the optical sensor 45 in the case where the carriage 40 is scanned in the primary scanning direction. Here, an abscissa indicates a position of the optical sensor 45 in the primary scanning direction and an ordinate indicates the output voltage Vs of the optical sensor 45. This figure shows a case where the disk tray 60 has not undergone any secular change. When the optical sensor 45 is moved, the optical sensor 45 first reaches a position above the hole 66b. Since the hole 66b transmits therethrough light irradiated by the photo emitter 451a, reflected light does not reach the photo receiver 451b and the photo receiver 451b is put in a state of being deactivated, so that an output voltage becomes VP. When the optical sensor 45 is moved to reach a position above the marker 66a, light irradiated by the photo emitter 451a is reflected with a high rate to reach the photo receiver 451b, so that the photo receiver 451b is put in a state of being activated and an output voltage becomes Vb. Here, since Vb<Vth is established, the CPU 100 judges that one end of the marker has been detected, and has the RAM 102 storing an output of the encoder 43 at that time.

When the carriage 40 is further moved, the optical sensor 45 moves onto the flat plate member of the disk tray 60 from the marker 66a. At this time, since the flat plate member reflects light to some extent, the optical sensor 45 outputs a voltage Vm somewhat lower than that with the hole 66b.

Here, because of Vm>Vth, the CPU 100 judges that the other end of the marker 66a has been detected, and stores an output of the encoder 43 at that time.

When the carriage 40 is further moved, the optical sensor 45 reaches one end of the marker 64a. As a result, an output of the optical sensor 45 changes to Vb from Vm. Here, because of Vb<Vth, the CPU 100 judges that one end of the marker 64a has been detected, and has the RAM 102 storing an output of the encoder 43 at that time.

When the carriage 40 is further moved, the optical sensor 45 reaches the hole 64b. As a result, an output of the optical sensor 45 changes to Vp from Vb. Here, because of Vb>Vth, the CPU 100 judges that the other end of the marker 64a has been detected, and stores an output of the encoder 43 at that time In the processings described above, respective ends of the marker 66a and the marker 64a are detected and outputs of the encoder 43 in respective occasions are stored in the RAM 102.

In this embodiment, since the marker 64a (66a) and the hole 64b (66b) are located adjacent to each other, the first signal is largely varied at the boundary between the hole and the marker, so that the marker can be surely detected.

Figure 8A:
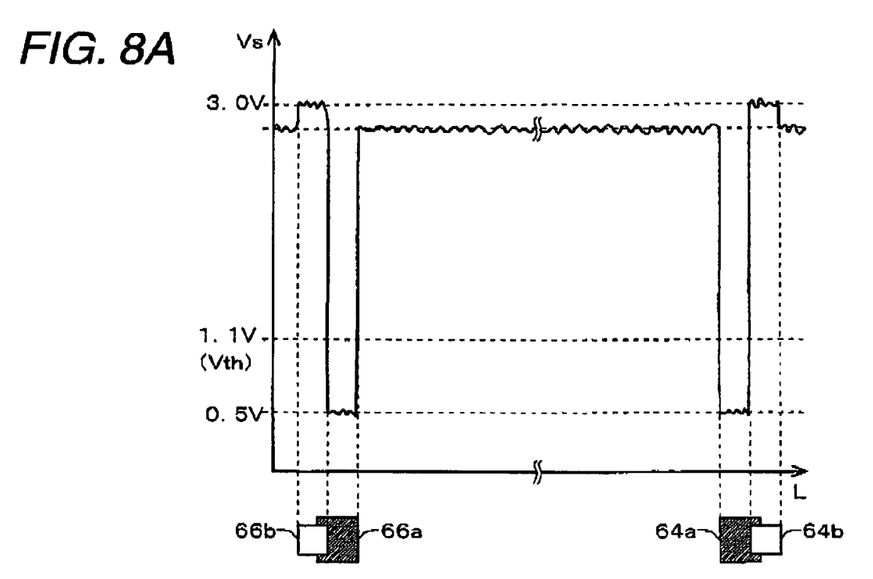
FIG. 8A is a diagram showing how to detect the marker in a related-art processing when the condition of the maker is normal.
Figure 8B:
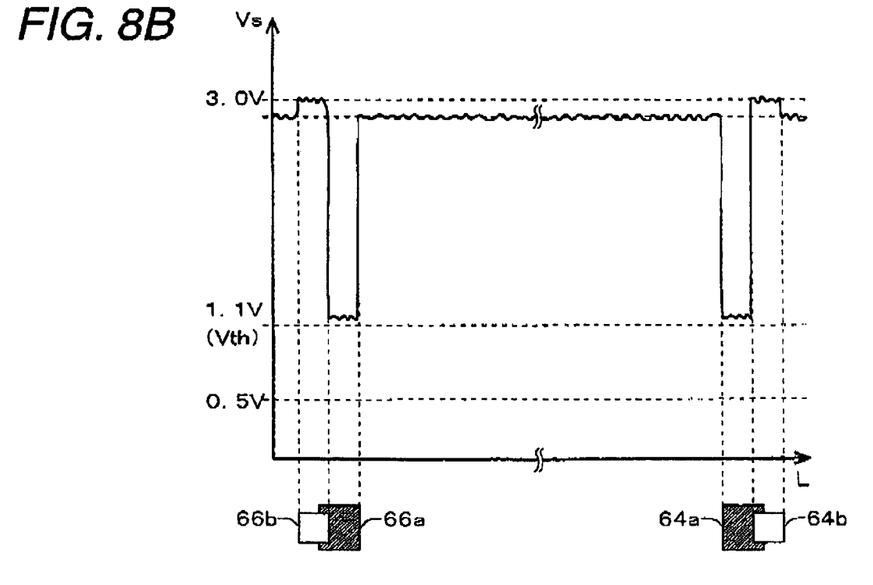
FIG. 8B is a diagram showing how to detect the marker in the related-art processing when the condition of the maker is deteriorated by secular change.

In this embodiment, an output voltage Vb of the optical sensor 45 for a marker is magnified to calculate a discriminant threshold Vth, and presence and absence of a marker are Judged on the basis of the discriminant threshold Vth. In a related art, since a discriminant threshold is a fixed value (in an example shown in FIGS. 8A and 8B, Vth =1.1 V), no problem is caused in the case where a marker is normal in optical reflectance as shown in FIG. 8A That is, assuming that an output voltage in the markers 64a, 66a is 0.5 V and an output voltage in the holes 64b, 66b is 0.3 V, 1.1 V existent therebetween is set as a discriminant threshold. As shown in FIG. 8B, however, in the case where a marker is decreased in optical reflectance due to secular change, etc., an output voltage Vs from the optical sensor 45 does not fall below the discriminant threshold Vth, so that it becomes impossible to detect a marker. Also, a similar situation is thought to occur in the case where not only an optical reflectance of a marker but also the sensitivity of the optical sensor 45 varies due to secular change, etc.

Figure 7B:
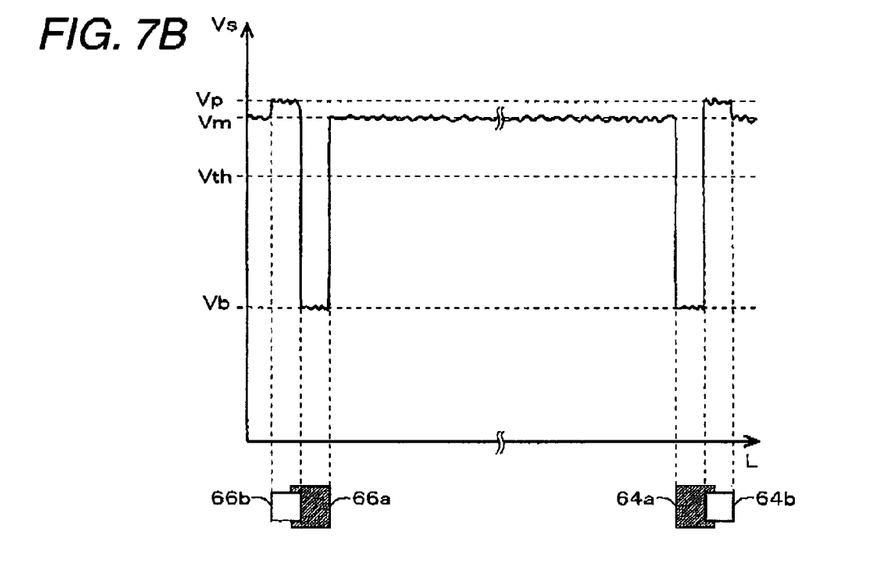
FIG. 7B is a diagram showing how to detect the marker in the processing when the condition of the maker is deteriorated by secular change.

On the other hand, in this embodiment, Vth is set according to variation in Vb, so that it is possible to surely detect a marker even in the case where a marker undergoes secular change to be decreased in optical reflectance, or the optical sensor 45 is varied in sensitivity. FIG. 7B shows the case a marker undergoes secular change to be decreased in optical reflectance. As shown in this figure, since the discriminant threshold Vth is set on the basis of Vb even in the case where the markers 64a, 66a are decreased in optical reflectance and Vb is decreased (since Vb<Vth is established), it is possible to surely detect the markers 64a, 66a.

Although an explanation has been given taking, as an example, the case where the markers 64a, 66a are detected, the markers 63a, 65a are also detected through the same processings and an output of the encoder 43 at the time of detection is stored in the RAM 102.

Step S17: The CPU 100 refers to information representative of a position of a marker detected in Step S16 to identify a position of an optical recording medium 80. That is, since the positional relationship between the markers 63a to 66a and an optical recording medium 80 is beforehand known, a position of an optical recording medium 80 can be identified indirectly by detecting positions of the markers 63a to 66a.

Step S18: The CPU 100 refers to a position of an optical recording medium 80 detected in Step S18 to identify a printing start position. Specifically, since the positional relationship between an optical recording medium 80 and the recording head 46 is made apparent by the processing in Step S17, a printing start position is identified on the basis of the positional relationship.

Step S19: The CPU 100 adjusts a position of picture data on the basis of a printing start position identified in Step S18, and thereafter executes the print processing. Specifically, after a printing start position is adjusted referring to a position of an optical recording medium 80 detected in Step S18, the print processing is executed on the basis of print data supplied from the personal computer 120, and a predetermined picture or the like is printed on a labeled surface of an optical recording medium 80.

Step S20: The CPU 100 drives the sheet feeding motor 51 to execute the processing of ejecting the disk tray 60. As a result, a user can take out the disk tray 60 from the printer 10 and remove an optical recording medium 80 from the disk tray 60.

The discriminant threshold Vth set in the manner described above can be stored in, for example, the EEPROM 103 to be made use of for a subsequent printing. In this case, since it is thought that a marker or the like has possibly undergone secular change in the case where a long time (for example, in the case where one year or longer elapses) elapses since a previous printing, a date, when printing is carried out at the last time, may be stored together with the discriminant threshold. A discriminant threshold may be set again in the case where a predetermined term or longer has elapsed (for example, in the case where one month or longer has elapsed).

As described above, according to the invention, since a value obtained by increasing (amplifying) an output voltage of the optical sensor 45 for a predetermined marker with a predetermined magnification greater than 1 is made use of as a discriminant threshold and presence or absence of a marker is judged, a marker can be surely detected even in the case where a marker is varied in optical reflectance due to secular change or the like.

Also, it is known that the optical sensor 45 can be varied in element sensitivity due to secular change, even in which case a marker can be stably detected in spite of secular change since a discriminant threshold is updated each time.

Also, while it is known that the optical sensor 45 involves dispersion in element sensitivity every one, a marker can be stably detected in spite of dispersion since an appropriate discriminant threshold is set every optical sensor.

In this embodiment, the above processings are performed based on an assumption that the disk tray 60 is Inserted into the normal position and the marker does not have stains attached thereto. However, the processings shown in FIG. 6 may be performed after it is detected whether this assumption is correct or not in accordance with the flow show in FIG. 9.

Figure 9:
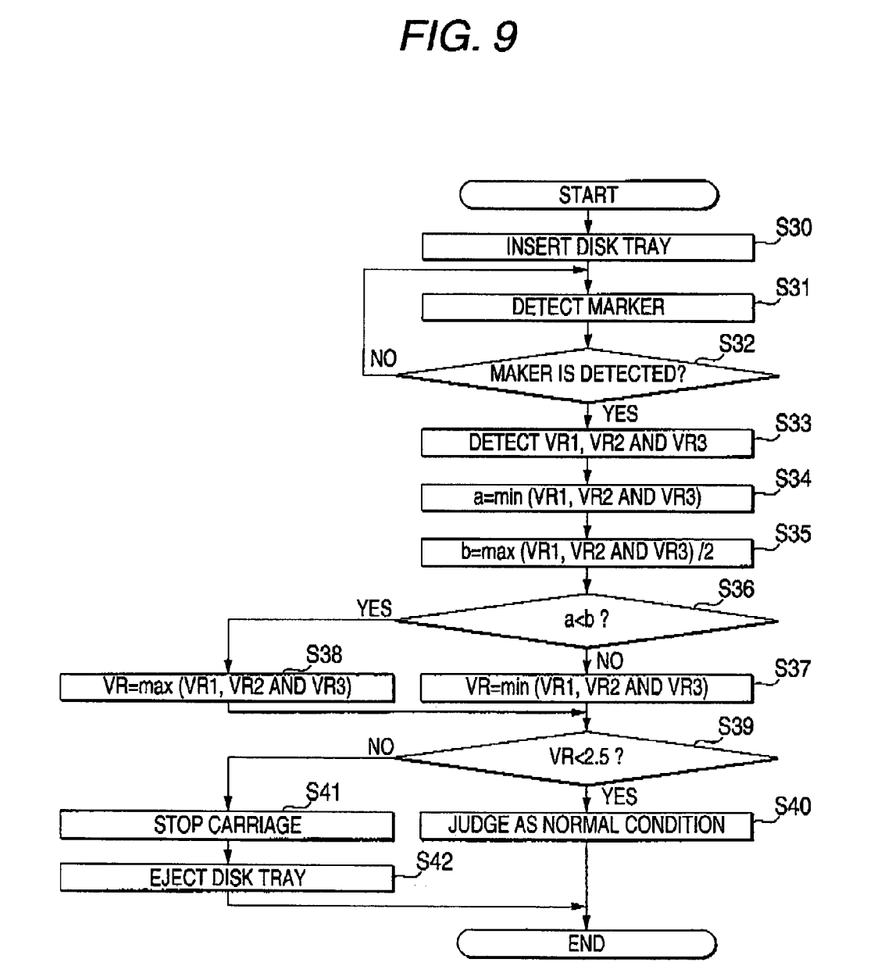
FIG. 9 is a flowchart showing a processing for detecting an abnormal condition of the disk tray.

Step S30: Similarly to Step 10 of FIG. 6, the user places an optical recording medium 80 into the recess 61 of the disk tray 60 and fixes the same with the disk support 61a. Then, the user inserts the disk tray 60 between the platen 32 of the printer 10 and the carriage 40 in the direction of the arrow shown in FIG. 3.

Step S31: The CPU100 detects the marker 62a by the optical sensor 45, while the marker 62a identifies whether the disk tray 60 is placed in a prescribed position. At this Ume, the CPU100 operates the carriage motor 26 with reference to the control data which is stored in the ROM101, moves to the position where the optical sensor 45 can detect the marker 62a.

Step S32: The CPU100 determines whether the disk tray 60 is placed in the prescribed position, with reference to the existence of the marker 62a detected in Step S31. When the disk tray 60 is placed in the prescribed position, the processing of Step S33 is performed. Otherwise, the same processing is repeated.

Figure 10:
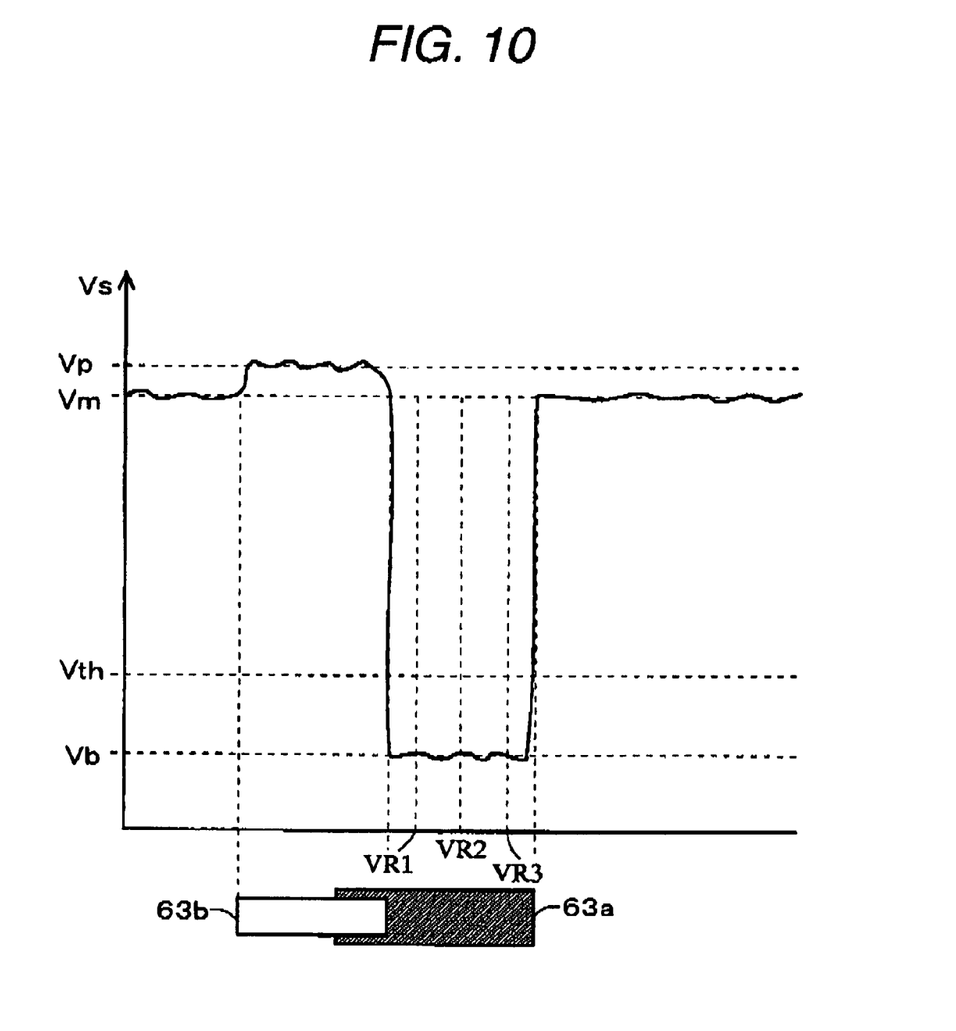
FIG. 10 is a diagram showing how to detect the abnormal condition of the disk tray.

Step S33: As shown in FIG. 10, the CPU100 detects the detection voltage VR1, VR2, VR3 of three points in a prescribed marker 63a That is, the CPU100 controls the carriage motor 26 and the sheet feeding motor 51 to move the optical sensor 45 to the marker 63a with reference to the control data stored In the ROM101. Then, the output voltage VR1-VR3 of the optical sensor 45 is detected with reference to the data of detection position stored in the ROM 101.

As a target marker, the marker 63a being closest to the marker 62a which is a target to be detected in Step S31 and having the smallest movement distance in the primary scanning direction and the secondary scanning direction, or the marker 64a, 66a existing in the edge which can be readily polluted with a user finger is selected. On the other hand, the marker 62a can be selected. Hereinafter, the marker 63a will be described as an example.

Step S34: The CPU100 substitutes a minimum value among the output voltage VR1, VR2, VR3 for the variable a [a=min(VR1, VR2, VR3)].

Step S35: The CPU100 substitutes a half of a maximum value among the output voltage VR1, VR2, VR3 for the variable b [b=max(VR1, VR2, VR3) /2].

Step S36: The CPU100 determines whether "a<b" is satisfied, by comparing the variable "a" with the variable "b".

When it is determined that the expression is satisfied, the processing of Step S38 is performed, Otherwise, the processing of Step S37 is performed. When the inserted position of the disk tray 60 is deviated from the normal position, at least one of VR1 to VR3 is detected from the location which is the outside of the marker 63a (or the location where a foreign substance is attached thereto).

In this case, the detection voltage which is detected from such a location has a value close to Vm or Vp shown in FIG. 10, while the detection voltage which is detected from the inside of the marker 63a has a value close to Vb. At this time, the voltage close to Vb is stored in the variable "a", while the voltage close to Vm/2 or Vp/2 is stored in the variable "b".

In this case, "Vb<Vm/2" or "Vb<Vp/2" is generally satisfied. Therefore, the processing of Step S38 is performed. When the marker 63a is dirty or when a foreign substance is attached to the marker 63a, the processing of Step S38 is performed in the same way as described above.

Step S37: The CPU100 substitutes the minimum value among the output voltage VR1 to VR3 for the variable VR. When the processings of Steps S36 to S37 are performed, the detection location of VR1 to VR3 is located in the inside of the marker 63a. Further, since there is no dirt, the values of VR1 to VR3 are close to Vb. Hence, In Step S37, the minimum value among VR1 to VR3 is stored.

Step S38: The CPU100 substitutes the maximum value among the output voltage VR1 to VR3 for the variable VR. When the processings of Steps S36 to S38 are performed, at least one of the detection locations corresponding to VR1 to VR3 is considered as being on the outside of the marker 63a or on the top of the foreign substance and thus the maximum value among VR1 to VR3 which is the detection value corresponding to the outside of the marker 63a or the foreign substance (Vp or Vm) is stored.

Step S39: The CPU100 determines whether the value of VR obtained in Step S37 or S38 is 2.5 V or less. The threshold value 2.5 V is the minimum value which the sensitivity of the optical sensor 45 can allow, and it is the minimum value which the reflectance of the marker 63a can allow. Accordingly, when the determination value is 2.5 V or more, it is determined that the value is within an allowable range.

Step S40: The CPU100 determines that the inserted position of the disk tray 60, the optical sensor 45, and the marker 63a are normal, Step S41: The CPU100 stops the movement of the carriage 40.

Step S42: The CPU100 ejects the disk tray 60, and informs the user that an error has occurred.

With the above configuration, when the inserted position of the disk tray 60 is not normal, a foreign substance is attached to the marker, or the sensitivity of the optical sensor 45 is abnormal, those cases can be detected and informed to the user, thereby, preventing the deviation in position due to the printing operation in an abnormal state.

In the above example shown in FIG. 9, the detection voltages of three points in the marker are obtained and the determination is performed based on the detection voltages. However, the determination may be performed based on two points or four points.

In Step S35, the half of the maximum value is substituted for a variable "b" and then is compared with the minimum value. However, any value (normally 1 or less) may be used as long as it is suitable for the apparatus and the use environment. Further, instead of comparison with the half value, the comparison may be performed based on the fact whether the difference between the maximum value and the minimum value departs from a prescribed range.

In Step S39, 2.5V is used as the threshold voltage. However, an arbitrary value may be used in accordance with the configuration of the apparatus.

In Step S37, the minimum value is set as VR. However, for example, a maximum value or a mean value may be set to be compared with the threshold value in Step 839.

In this embodiment, a value corresponding to an output of the optical sensor 45 for a marker is increased with a predetermined magnification greater than 1 to provide a discriminant threshold. However, a discriminant threshold may be determined by using a value corresponding to an output of the optical sensor 45 for a marker and other parts (for example, a hole or a flat plate member).

Specifically, in the case where, for example, an output voltage of the optical sensor 45 for a hole or a flat plate member is made Vp, a discriminant threshold may be provided assuming Vth=k(Vp−Vb)+Vb. In addition, a predetermined value (for example, "0.2" or the like), which provides for k<1 according to an environment in use and a state of a printer as used is set as k. According to such method, a discriminant threshold Vth is set to a predetermined position between Vb and Vp, so that it is possible to surely detect a marker even in case of variation in element sensitivity.

In this embodiment, the disk tray 60 includes five markers 62a to 66a. However, the number of markers may be greater than the above.

In this embodiment, the marker 62a is made use of in order to set a discriminant threshold. However, this may be applied to other markers than the above. In short, it suffices to select a marker suited to a purpose of use in a range free of erroneous detection.

Figure 6:
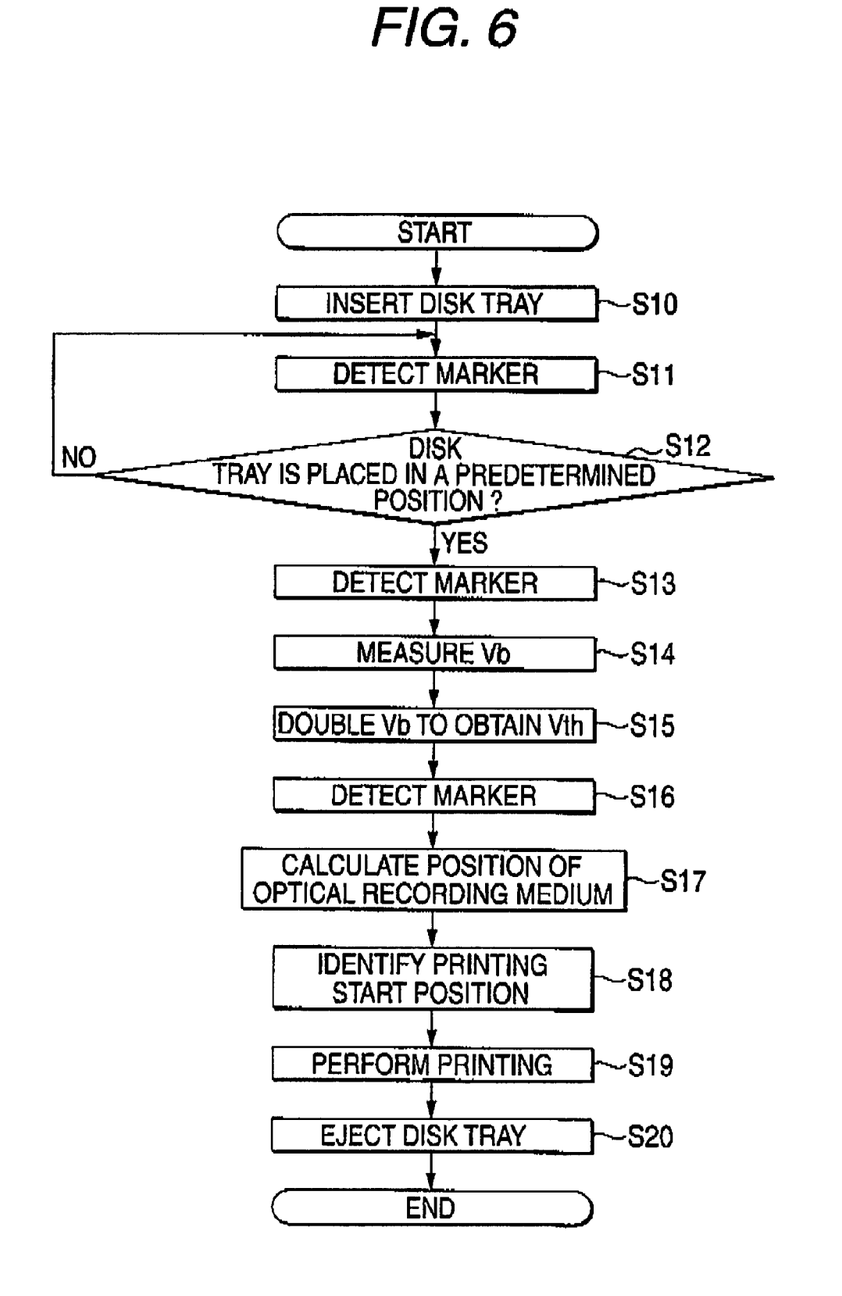
FIG. 6 is a flowchart showing a processing for detecting a position of a printing medium performed in the printer.

In this embodiment, the program for execution of the processing shown in FIG. 6 is stored in the ROM 101. However, the program may be stored in the personal computer 120.

In this embodiment, print data is supplied from the personal computer 120. However, a removable recording medium may be connected to the printer 10 and print data may be supplied directly from the recording medium.

In this embodiment, only the single optical sensor 45 is provided. However, a plurality of optical sensors may be provided and a marker may be detected by the respective sensors. In this case, a discriminant threshold may be set every optical sensor, or a discriminant threshold may be set for a specific optical sensor and a discriminant threshold may be calibrated and used taking account of a difference in sensitivity for other optical sensors.

The processing can be executed by a computer. In this case, a program Is provided to describe the content of a processing that the printing apparatus executes. A computer executes the program whereby the processing is performed in the computer. The program, which describes the content of the processing, can be recorded in a recording medium, which can be read by a computer. A recording medium, which can be read by a computer, includes a magnetic recording system, an optical disk, a magneto-optical recording medium, a semiconductor memory, etc. The magnetic recording system includes a hard disk drive (HDD), a floppy disk (FD), a magnetic tape, etc. The optical disk includes a DVD, a DVD-RAM, a CD-ROM, a CD-R/RW (Rewritable), etc. The magneto-optical recording medium includes an MO (magneto-Optical disk), etc.

In case of distribution of programs, portable recording media, such as DVD, CD-ROM, etc., with the programs recorded are sold. Also, programs are stored in a storage device of a server computer, and the programs can be transferred to other computers from the server computer.

A computer that executes programs stores in its own storage device programs recorded in a portable recording medium, or programs transferred from the server computer. The computer reads the programs from its own storage device to execute a processing according to the programs. In addition, the computer can read the programs directly from a portable recording medium to execute a processing according to the programs. Also, the computer can also execute a processing sequentially according to the received programs each time a program is transferred from the server computer.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The disclosures of Japanese Patent Application Nos. 2006-94784 filed Mar. 29, 2005 and 2006-88275 filed Mar. 28, 2006, including specifications, drawings and claims are incorporated herein by reference in their entirety.

What is claimed is:

1. A method of detecting a position of an optical recording medium on which a printing is performed, the method comprising:

providing an optical sensor comprising a photo emitter operable to emit light and a photo receiver operable to receive light and output a first signal in accordance with an amount of the received light;

transporting the optical sensor to a position above a marker provided on the tray:

emitting light from the photo emitter to irradiate the marker;

receiving light reflected from the marker with the photo receiver;

determining a reference value based on a first value of the first signal outputted when the marker is irradiated;

executing a predetermined calculation with respect to the reference value to determine a threshold value;

transporting the optical sensor above the tray, while emitting light from the photo emitter and comparing the first signal outputted from the photo receiver with the threshold value;

identifying a position of the marker based on the comparison of the first signal and the threshold value;

determining a position at which the printing begins based on the identified position of the marker;

transporting the optical sensor to positions at which the marker is assumed to be placed;

emitting light from the photo emitter at the respective positions to irradiate the tray;

receiving light reflected from the tray at the respective positions to generate detection signals; and judging at least one of whether a position of the tray is normal and whether a state of the marker is normal, based on the detection signals.

2. The method as set forth in claim 1, wherein:

the judging is performed whether a difference between a maximum value and a minimum value of the detection signals is no less than a prescribed value; and it is judged an abnormal state of at least one of the position of the tray and the state of the marker when the difference is no less than the prescribed value.

3. The method as set forth in claim 2, wherein:

the judging is performed whether the maximum value is no less than a prescribed value; and it is judged an abnormal state of at least one of the position of the tray and the state of the marker when the maximum value is no less than the prescribed value.

4. A recording medium having recorded a program operable to cause a computer to execute the method as set forth in claim 1.

* * * * *